United States Patent
Ayers

(10) Patent No.: US 9,997,052 B1
(45) Date of Patent: Jun. 12, 2018

(54) CELL PHONE RECOVERY DEVICE

(71) Applicant: Albert Ayers, Memphis, TN (US)

(72) Inventor: Albert Ayers, Memphis, TN (US)

(*) Notice: Subject to any disclaimer, the term of this patent is extended or adjusted under 35 U.S.C. 154(b) by 0 days. days.

(21) Appl. No.: 15/431,858

(22) Filed: Feb. 14, 2017

(51) Int. Cl.
G08B 1/08 (2006.01)
G08B 21/24 (2006.01)
H04W 76/02 (2009.01)
H04W 76/04 (2009.01)
G08B 3/10 (2006.01)
G08B 21/18 (2006.01)
G08B 21/02 (2006.01)
H04B 1/3888 (2015.01)
H02J 7/00 (2006.01)

(52) U.S. Cl.
CPC ........... *G08B 21/24* (2013.01); *G08B 3/1016* (2013.01); *G08B 21/0269* (2013.01); *G08B 21/182* (2013.01); *H02J 7/0045* (2013.01); *H04B 1/3888* (2013.01); *H04W 76/023* (2013.01); *H04W 76/045* (2013.01); *H04W 76/14* (2018.02); *H04W 76/25* (2018.02)

(58) Field of Classification Search
CPC .... G08B 13/1427; G08B 21/24; G08B 25/10; H04M 1/72516; H04M 1/7253; H04W 88/02
See application file for complete search history.

(56) References Cited

U.S. PATENT DOCUMENTS

| | | | |
|---|---|---|---|
| 5,796,338 A | 8/1998 | Mardirossian | |
| 7,333,776 B1 | 2/2008 | York | |
| 7,535,357 B2 | 5/2009 | Enitan | |
| D626,119 S | 10/2010 | Fellig | |
| 2002/0173279 A1* | 11/2002 | Doi | H04M 1/0283 455/575.1 |
| 2003/0043037 A1 | 3/2003 | Lay | |
| 2004/0205255 A1* | 10/2004 | Joachim | G06F 1/1626 710/1 |
| 2007/0298759 A1* | 12/2007 | Lu | H04M 1/7253 455/404.1 |
| 2009/0207013 A1* | 8/2009 | Ayed | G08B 13/1427 340/539.1 |
| 2015/0009027 A1* | 1/2015 | Harvey | G08B 25/016 340/539.12 |
| 2015/0317898 A1 | 11/2015 | Marsh | |

FOREIGN PATENT DOCUMENTS

WO 9834417 A1 8/1998

* cited by examiner

*Primary Examiner* — Omeed Alizada
(74) *Attorney, Agent, or Firm* — Kyle A. Fletcher, Esq.

(57) ABSTRACT

The cell phone recovery device is configured for use with a personal data device. The cell phone recovery device establishes a wireless communication link between the cell phone recovery device and the personal data device The cell phone recovery device to monitors the span of the distance between the cell phone recovery device and the personal data device. Should the span of the distance between the cell phone recovery device and the personal data device exceed a previously determined threshold, the cell phone recovery device generates an audible alarm. The cell phone recovery device comprises a first logic module and a first communication module. The first communication module is electrically connected to the first logic module. The first communication module establishes and maintains the wireless communication link between the cell phone recovery device and the personal data device.

16 Claims, 5 Drawing Sheets

CELL PHONE RECOVERY DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of electric communication technique including telephonic communication, more specifically, a service or facility adapted for the subscriber.

SUMMARY OF INVENTION

The cell phone recovery device is an electronic device. The cell phone recovery device is configured for use with a personal data device. The cell phone recovery device is attached to a person or to an item carried by the person. The cell phone recovery device establishes a wireless communication link between the cell phone recovery device and the personal data device that allows the cell phone recovery device to monitor the span of the distance between the cell phone recovery device and the personal data device. Should the span of the distance between the cell phone recovery device and the personal data device become greater than a previously determined threshold, the cell phone recovery device generates an audible alarm indicating to the person that they have become separated from their personal data device. The cell phone recovery device comprises a first logic module and a first communication module. The first communication module is electrically connected to the first logic module. The first communication module establishes and maintains the wireless communication link between the cell phone recovery device and the personal data device.

These together with additional objects, features and advantages of the cell phone recovery device will be readily apparent to those of ordinary skill in the art upon reading the following detailed description of the presently preferred, but nonetheless illustrative, embodiments when taken in conjunction with the accompanying drawings.

In this respect, before explaining the current embodiments of the cell phone recovery device in detail, it is to be understood that the cell phone recovery device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the cell phone recovery device.

It is therefore important that the claims be regarded as including such equivalent construction insofar as they do not depart from the spirit and scope of the cell phone recovery device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
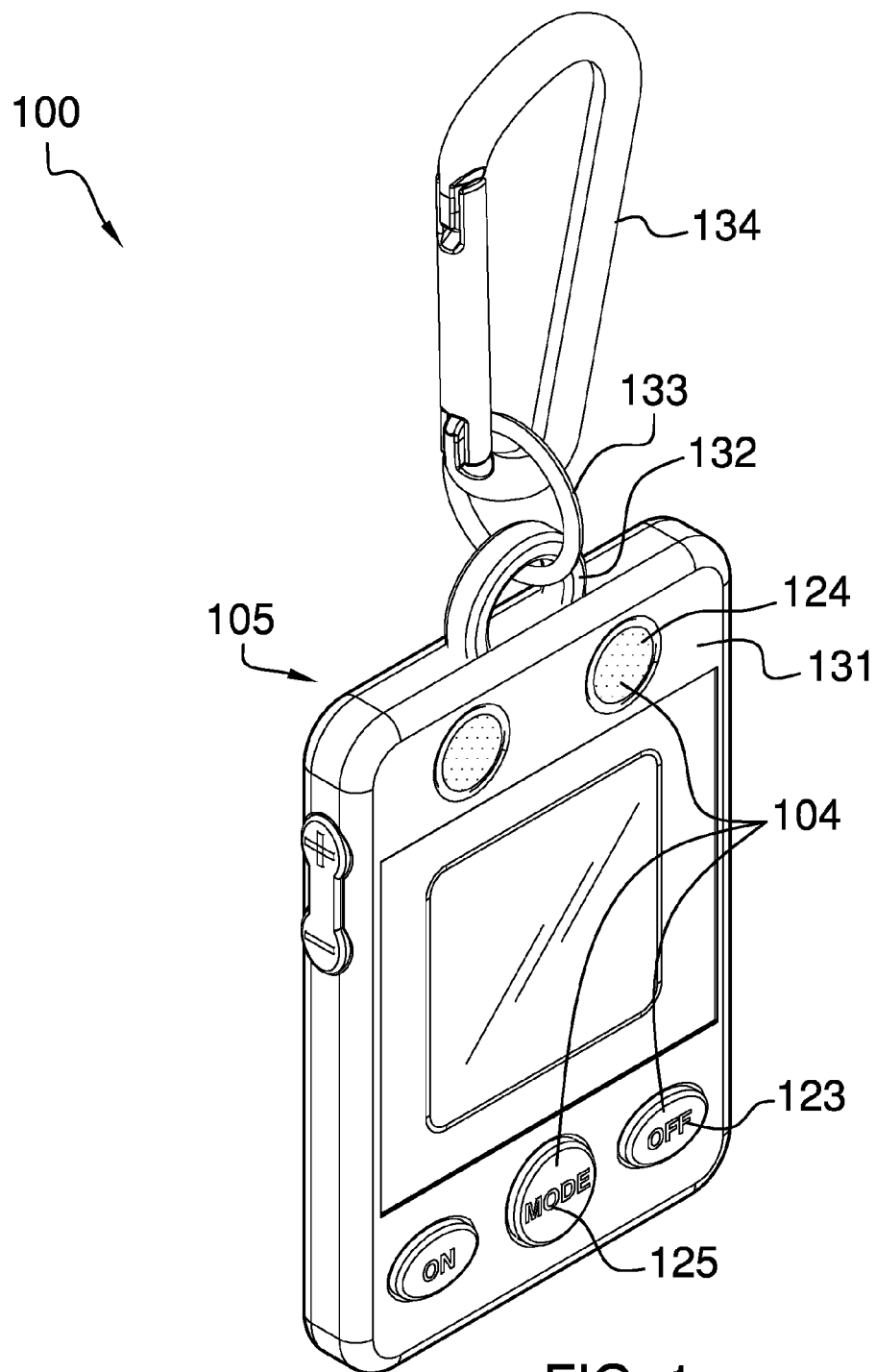
FIG. 1 is a perspective view of an embodiment of the disclosure.
Figure 2:
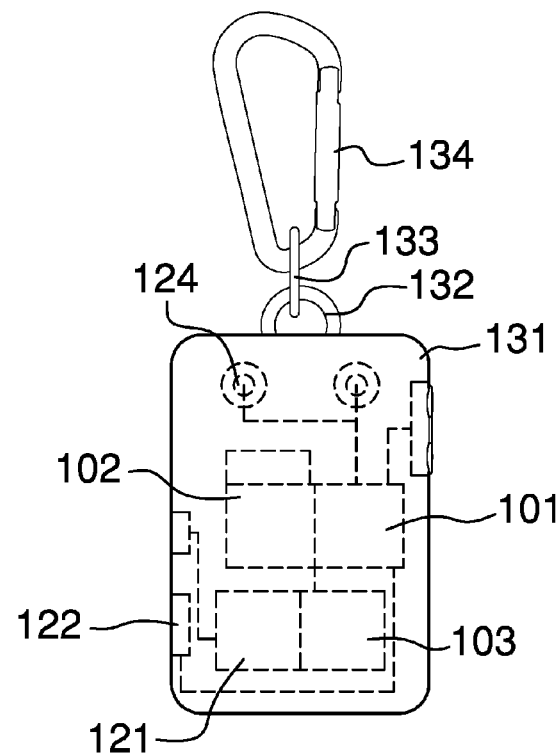
FIG. 2 is a front view of an embodiment of the disclosure.
Figure 3:
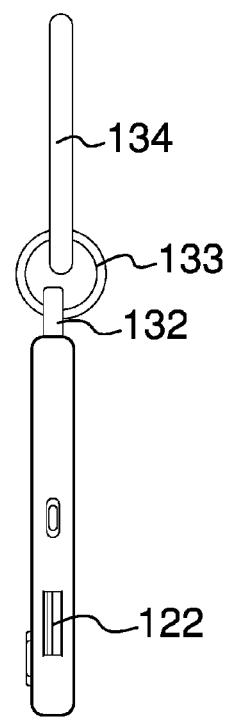
FIG. 3 is a side view of an embodiment of the disclosure.
Figure 4:
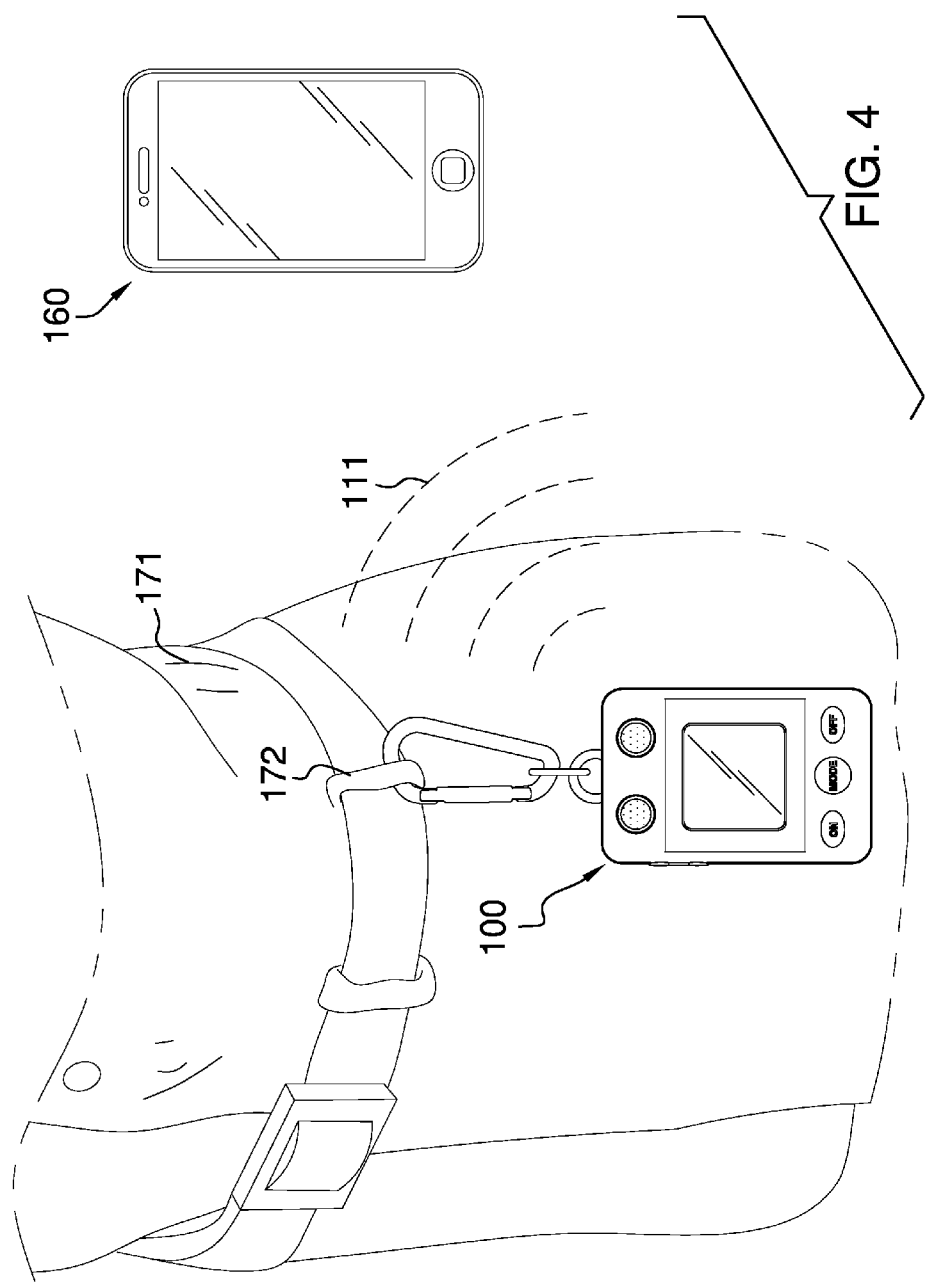
FIG. 4 is an in use view of an embodiment of the disclosure.
Figure 5:
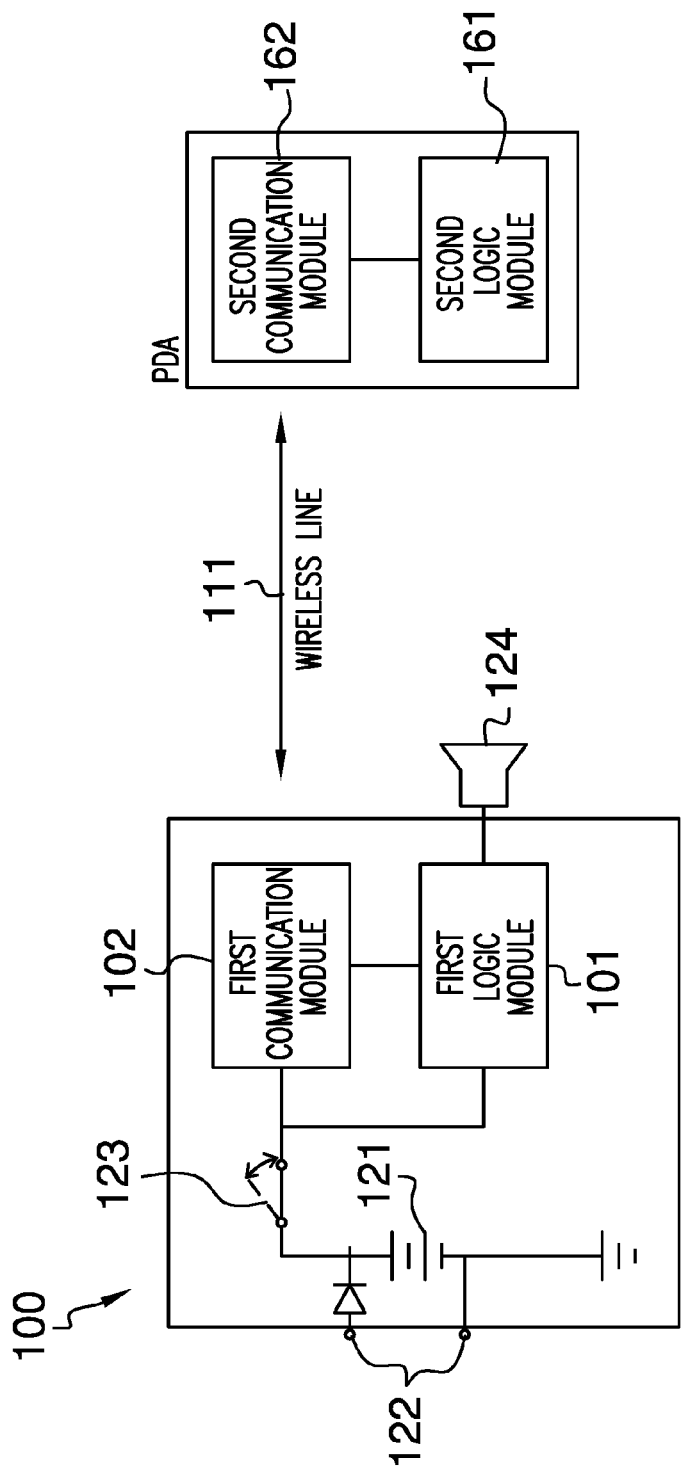
FIG. 5 is a block diagram of an embodiment of the disclosure.
Figure 6:
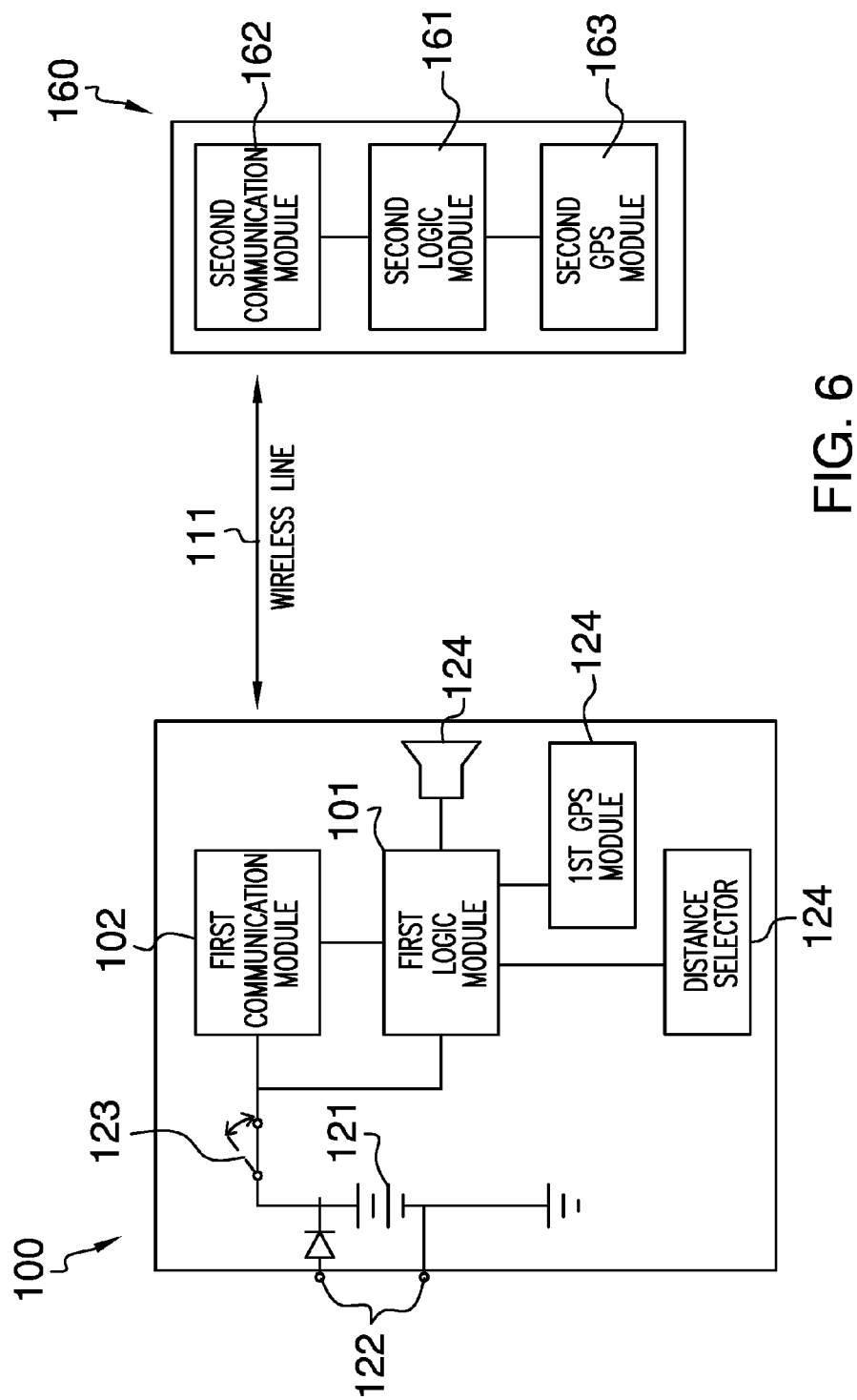
FIG. 6 is a block diagram of an alternate embodiment of the disclosure.

Detailed reference will now be made to one or more potential embodiments of the disclosure, which are illustrated in FIGS. 1 through 6.

The cell phone recovery device 100 (hereinafter invention) is an electronic device. The invention 100 is configured for use with a personal data device 160. The personal data device 160 is a handheld electronic device that is commonly carried by a person 171. The personal data device 160 is further defined with a second logic module 161, and a second communication module 162. The second logic module 161 is a programmable electronic device that is used to manage, regulate, and operate the personal data device 160. The second communication module 162 is a wireless electronic communication functionality within the personal data device 160 that is used to establish the wireless communication link 111 between the personal data device 160 and the first communication module 102. The invention 100 is attached to a person 171 or to domestic article 172 carried by the person 171. The person 171 refers to the user of the invention 100. The domestic article 172 refers to any article that may be carried or worn by the person 171 other than the personal data device 160.

The invention 100 establishes a wireless communication link 111 between the invention 100 and the personal data device 160 that allows the invention 100 to monitor the span of the distance between the invention 100 and the personal data device 160. Should the span of the distance between the invention 100 and the personal data device 160 become greater than a previously determined threshold, the invention 100 generates an audible alarm indicating to the person 171 that they have become separated from their personal data device 160. The invention 100 comprises a first logic module 101, a first communication module 102, a user interface 104, and a housing 105. The first communication module 102 is electrically connected to the first logic module 101. The first communication module 102 establishes and maintains the wireless communication link 111 between the invention 100 and the personal data device 160. The user interface 104 electrically connects to the first logic module 101.

The first logic module 101 is a programmable electronic device that is used to manage, regulate, and operate the invention 100. Depending on the specific design and the selected components, the first logic module 101 can be a separate component within the invention 100 or incorporated into other components of the invention 100.

The first communication module 102 is a readily and commercially available wireless electronic communication device that establishes a wireless communication link 111 between the invention 100 and the personal data device 160. The wireless communication link 111 is a radio frequency communication link that is established between the invention 100 and the personal data device 160. The wireless communication link 111 is monitored via the first logic module 101.

The housing 105 is a rigid case within which the first logic module 101, the first communication module 102, the first GPS module 103 (when used), and the user interface 104 are contained. The housing 105 is designed such that portions of the user interface 104 are accessible from the exterior of the housing 105 by the person 171. The housing 105 comprises a shell 131, a loop 132, a ring 133, and a carabiner 134. The first GPS module 103 is discussed in detail elsewhere within this disclosure.

The shell 131 is a hard sided container within which the first logic module 101, the first communication module 102, the first GPS module 103, and the user interface 104 are contained. The loop 132 is a loop like structure that is formed on the exterior of the shell 131. The loop 132 provides a location to which a fastener may be attached.

The ring 133 is an intermediate fastening device that is attached to the loop 132. The use of the ring 133 is a convenience that expedites the ability of the person 171 to change the domestic article 172 to which the invention 100 is attached. In the first potential embodiment of the disclosure, the ring 133 is a readily and commercially available key ring. The carabiner 134 is a readily and commercially available coupling link that is used to attach the invention 100 to the domestic article 172.

The user interface 104 comprises a collection of interface devices that allow the person 171 using the invention 100 the capability of operating and maintaining the invention 100. The user interface 104 comprises a battery 121, a charging port 122, an on off switch 123, and a speaker 124.

The battery 121 is a commercially available battery 121. The chemical energy stored within the battery 121 is renewed and restored through use of the charging port 122. The charging port 122 is an electrical circuit that reverses the polarity of the battery 121 and provides the energy necessary to reverse the chemical processes that the battery 121 initially used to generate the electrical energy. This reversal of the chemical process creates a chemical potential energy that will later be used to generate electricity. The charging port 122 is an electrical connection that connects the battery 121 to an external source of electric energy. In the first potential embodiment of the disclosure, the charging port 122 is a readily and commercially available USB port.

The on off switch 123 is a readily and commercially available switch. As shown most clearly in FIGS. 5 and 6, the on off switch 123 completes and interrupts a circuit that allows electricity to flow from the battery 121 to the first logic module 101, the first communication module 102, and, when used, the first GPS module 103.

The speaker 124 is a readily and commercially available transducer that is: 1) controlled by the first logic module 101; and, 2) is used to generate an audible alarm signal. In the first potential embodiment of the disclosure, the speaker 124 is a readily and commercially available buzzer.

The operation of the all potential embodiments of the disclosure are described in this paragraph. The first communication module 102 establishes a wireless communication link 111 with the second communication module 162. The wireless communication link 111 is monitored by the first logic module 101. Should the first logic module 101 determine through the wireless communication link 111 that the span of the distance between the cell phone recovery device and the personal data device 160 become greater than a previously determined threshold then the first logic module 101 acts as an audio source that send an electric signal to a speaker 124 that uses the electric signal to generate an audible alarm.

In the first potential embodiment of the disclosure, as described in this paragraph, the selection of the communication protocol is used to establish the previously determined threshold of distance allowed between the invention 100 and the personal data device 160. In the first potential embodiment of the disclosure, the first logic module 101 simply monitors the establishment of the wireless communication link 111. Should the span of the distance between the cell phone recovery device and the personal data device 160 become greater than the effective range of the selected communication protocol used by the first communication module 102 and the second communication module 162 then the wireless communication link 111 will become broken.

In this circumstance, the first logic module 101 detects the failure of the wireless communication link 111 and sends the electric signal to the speaker 124 to generate the audible alarm signal. In the first potential embodiment of the disclosure, the communication protocol is selected from the group consisting of a Bluetooth protocol and an 802.11b/g protocol (commonly referred to as Wi-Fi). The practical effective range of the Bluetooth protocol is approximately 30 feet. The practical effective range of the 802.11b/g protocol is approximately 145 feet. At approximately these ranges it is expected that the loss of the wireless communication link 111 would be detected by the first logic module 101.

In the second potential embodiment of the disclosure, as described in this paragraph and the next 2 paragraphs, the invention 100 further comprises a first GPS module 103. The first GPS module 103 is an electrical device that communicates with the GPS to determine the GPS coordinates of the first GPS module 103. When queried by the first logic module 101, the first GPS module 103 communicates with the GPS to determine the GPS coordinates of the first GPS module 103 and transfers the GPS coordinates of the first GPS module 103 to the first logic module 101. The user interface 104 further comprises a distance mode 125. The first GPS module 103 is electrically connected to the first logic module 101. The personal data device 160 is further defined with a second GPS module 163. The second GPS module 163 is an electrical device that communicates with the GPS to determine the GPS coordinates of the second GPS module 163.

When queried by the second logic module 161, the second GPS module 163 communicates with the GPS to determine the GPS coordinates of the second GPS module 163 and transfers the GPS coordinates of the second GPS module 163 to the second logic module 161. The first GPS module 103 and the second GPS module 163 are used to estimate the span of the distance between the invention 100 and the personal data device 160. The distance mode 125 is a switch that is incorporated in the second potential embodiment of the disclosure. The distance mode 125 is used to select the previously determined threshold distance permitted between the invention 100 and the personal data device 160. The use of a switch to select the mode of an electronic device is well known and documented in the electrical arts. Such switching devices are commercially available.

In the second potential embodiment of the disclosure, the first logic module 101 queries the second logic module 161 using the first communication module 102 and the second communication module 162 for the GPS coordinates of the second GPS module 163. Upon receipt of the query from the first logic module 101 the second logic module 161 queries the second GPS module 163 for the GPS coordinates of the second GPS module 163. The second logic module 161 then sends the coordinates of the second GPS module 163 to the first logic module 101 using the second communication module 162 and the first communication module 102.

The first logic module 101 further queries the first GPS module 103 to determine the GPS coordinates of the first GPS module 103. The first logic module 101 uses the coordinates of the first GPS module 103 and the coordinates of the second GPS module 163 to determine the span of the distance between the invention 100 and the personal data device 160. Should the first logic module 101 determine through this calculation that the distance between the invention 100 and the personal data device 160 be greater than the previously determined threshold distance as selected by the distance mode 125 than the first logic module 101 sends an electric signal to the speaker 124 to generate the audible alarm signal.

The following definitions were used in this disclosure:

Audio Source: As used in this disclosure, an audio source is a device that generates electrical signals that can be converted in to audible sounds by a speaker.

Battery: As used in this disclosure, a battery is a container consisting of one or more cells, in which chemical energy is converted into electricity and used as a source of power.

Buzzer: As used in this disclosure, a buzzer is two lead electrical device that generates an audible sound when voltage is applied to the two leads.

Carabiner: As used in this disclosure, a carabiner is coupling link that is usually formed as an oblong metal ring with one spring hinged side that is used to open and close the ring. Synonyms for carabiner include D-link.

Diode: As used in this disclosure, a diode is a two terminal semiconductor device that allows current flow in only one direction. The two terminals are called the anode and the cathode. Electric current is allowed to pass from the anode to the cathode.

Domestic Article: As used in this disclosure, a domestic article is an item or object: 1) that is commonly found within a household; or, 2) that is commonly carried by a person. Examples of domestic articles include, but are not limited to, keys and key fobs, personal data devices, glasses, remote controls, or personal storage items such as purses, briefcases, wallets, or cases.

Exterior: As used in this disclosure, the exterior is use as a relational term that implies that an object is not contained within the boundary of a structure or a space.

Findings: As used in this disclosure, findings are small decorative elements, fasteners, or tools for fit, function, or adjustment that are used with or attached to apparel or footwear.

GPS: As used in this disclosure, depending on the context GPS refers to: 1) a system of navigational satellites that are used to determine the position and velocity of a person or object; 2) the system of navigational satellites referred to in the first definition that are used to synchronize to global time; or, 3) an electronic device or that uses the system of navigational satellites referred to in the first definition to determine the position of a person or object. GPS is an acronym for Global Positioning System.

Handheld: As used in this disclosure, when referring to an item or device, handheld means that the item or device is small and light enough to be operated while a person holds the item or device in their hands.

Housing: As used in this disclosure, a housing is a rigid casing that encloses and protects one or more devices.

Interior: As used in this disclosure, the interior is use as a relational term that implies that an object is contained within the boundary of a structure or a space.

Logic Module: As used in this disclosure, a logic module is an electrical device that is programmable and that accepts digital and analog inputs, processes the digital and analog inputs according to previously stored instruction and provides the results of these instructions as digital or analog outputs.

Loop: As used in this disclosure, a loop is the length of a first linear structure including, but not limited to, lines, cords, or ribbons, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

Personal Data Device: As used in this disclosure, a personal data device is a handheld device that is used for managing personal information and communication. Examples of personal data device include, but are not limited to, cellular phones, tablets and smart phones.

Ring: As used in this disclosure, a ring is term that is used to describe a flat or plate like structure through which an aperture is formed.

Speaker: As used in this disclosure, a speaker is an electrical device that converts an electrical signal into an audible sound.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Transducer: As used in this disclosure, a transducer is a device that converts a physical quantity, such as pressure or brightness into an electrical signal or a device that converts an electrical signal into a physical quantity.

USB: As used in this disclosure, USB is an acronym for Universal Serial Bus, which is an industry standard that defines the cables, the connectors, the communication protocols and the distribution of power required for interconnections between electronic devices. The USB standard defines several connectors including, but not limited to, USB-A, USB-B, mini-USB, and micro USB connectors.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An accessory comprising:
a first logic module,
a first communication module,
a user interface, and a housing;
wherein the first communication module is electrically connected to the first logic module;
wherein the first communication module establishes and maintains a wireless communication link between the accessory and a personal data device;
wherein the user interface electrically connects to the first logic module;
wherein the accessory is configured for use with the personal data device;
wherein the personal data device is further defined with a second logic module, and a second communication module;
wherein the accessory is attached to a location selected from the group consisting of a person or to a domestic article carried by a person;
wherein the accessory establishes the wireless communication link between the accessory and the personal data device that allows the accessory to monitor span of a distance between the accessory and the personal data device;
wherein when the span of the distance between the accessory and the personal data device becomes greater than a previously determined threshold, the accessory generates an audible alarm;
wherein the first logic module is a programmable electronic device; wherein the first communication module is a wireless electronic communication device; wherein the wireless communication link is a radio frequency communication link; wherein the wireless communication link is monitored by the first logic module;
wherein a housing is a rigid case within which the first logic module, the first communication module, and the user interface are contained; wherein the housing is designed such that portions of the user interface are accessible from the exterior of the housing by the person; and
wherein the housing comprises a shell, a loop, a ring, and a carabiner;
wherein the shell is a hard sided container within which the first logic module, the first communication module, and the user interface are contained;
wherein the loop is a loop like structure that is formed on the exterior of the shell; wherein the ring is an intermediate fastening device that is attached to the loop;
wherein the carabiner is a coupling link that is used to attach the accessory to the selected location.

2. The accessory according to claim 1, wherein the user interface comprises a battery, a charging port, an on off switch, and a speaker;
wherein the battery is a commercially available battery;
wherein the chemical energy stored within the battery is renewed and restored through use of the charging port;
wherein the on off switch completes and interrupts a circuit that allows electricity to flow from the battery to the first logic module and the first communication module;
wherein the speaker is a transducer; wherein the speaker is controlled by the first logic module;
wherein the speaker generates an audible alarm signal.

3. The accessory according to claim 2, wherein the charging port is an electrical circuit that reverses a polarity of the battery.

4. The accessory according to claim 3 wherein the first communication module establishes a wireless communication link with the second communication module.

5. The accessory according to claim 4 wherein the wireless communication link is monitored by the first logic module.

6. The accessory according to claim 5, wherein should the first logic module determine through the wireless communication link that the span of the distance between the accessory and the personal data device become greater than a previously determined threshold then the first logic module acts as an audio source that sends an electric signal to the speaker to generate the audible alarm.

7. The accessory according to claim 6, wherein a selection of the communication protocol is used to establish the previously determined threshold of distance allowed between the accessory and the personal data device.

8. The accessory according to claim 7 wherein should the span of the distance between the accessory and the personal data device become greater than the effective range of the selected communication protocol used by the first communication module and the second communication module then the wireless communication link will become broken; wherein in this circumstance, the first logic module detects a failure of the wireless communication link and sends the electric signal to the speaker to generate the audible alarm signal.

9. The accessory according to claim 8
wherein the communication protocol is selected from a first communication protocol and a second communication protocol;
wherein the practical effective range of the first protocol is between 20 feet (6 meters) and 40 feet (12 meters);
wherein the practical effective range of the second protocol is between 130 feet (40 meters) and 160 feet (50 meters).

10. The accessory according to claim 6
wherein the user interface further comprises a distance mode;
wherein the distance mode is a switch;
wherein the distance mode is used to select the previously determined threshold distance permitted between the accessory and the personal data device.

11. The accessory according to claim 10 wherein the accessory further comprises a first GPS module; wherein the first GPS module is an electrical device that communicates with a GPS to determine a GPS coordinates of the first GPS module; wherein the first GPS module and a second GPS module are used to estimate the span of the distance between the accessory and the personal data device.

12. The accessory according to claim 11, wherein the personal data device is further defined with the second GPS module; wherein the second GPS module is an electrical device that communicates with the GPS to determine a GPS coordinates of the second GPS module; wherein the first logic module queries the second logic module using the first communication module and the second communication module to request the GPS coordinates of the second GPS module; wherein upon receipt of the query from the first logic module the second logic module queries the second GPS module for the GPS coordinates of the second GPS module; wherein the second logic module sends the coordinates of the second GPS module to the first logic module using the second communication module and the first communication module.

13. The accessory according to claim 12
wherein the first GPS module is electrically connected to the first logic module;
wherein the first logic module further queries the first GPS module to determine the GPS coordinates of the first GPS module;
wherein the first logic module uses the coordinates of the first GPS module and the coordinates of the second GPS module to determine the span of the distance between the accessory and the personal data device;
wherein should the first logic module determine through this calculation that the distance between the accessory and the personal data device be greater than the previously determined threshold distance as selected by the distance mode than the first logic module sends an electric signal to the speaker to generate the audible alarm signal.

14. The accessory according to claim 13 Wherein the first GPS module is contained within the shell.

15. The accessory according to claim 14 wherein the ring is a key ring.

16. The accessory according to claim 15 wherein the speaker is a buzzer.

\* \* \* \* \*